United States Patent [19]

Tobia

[11] 4,313,961

[45] Feb. 2, 1982

[54] METHOD OF MAKING A COMPLETE MEAL FOOD PRODUCT

[76] Inventor: Enrico Tobia, Fleischmanns, N.Y. 12430

[21] Appl. No.: 191,956

[22] Filed: Sep. 29, 1980

Related U.S. Application Data

[63] Continuation of Ser. No. 31,543, Apr. 19, 1979, abandoned.

[51] Int. Cl.$^3$ .................. A21D 13/00; A21D 13/08; A23J 1/20; A23L 1/00
[52] U.S. Cl. ........................................ 426/19; 426/92; 426/94; 426/138; 426/296; 426/556; 426/491
[58] Field of Search ............... 426/94, 92, 95, 283, 426/295, 296, 303, 305, 497, 502, 3, 549, 19, 36, 39, 582, 491, 556, 804, 138

[56] References Cited

U.S. PATENT DOCUMENTS

1,222,304 4/1917 Kohman .............................. 426/19
3,667,963 6/1972 Katter et al. ........................ 426/94

OTHER PUBLICATIONS

Family Circle Cooking, vol. 3, Rockville House Pub. Inc., N.Y., 1972, pp. 361-362.
Woman Day's Encyclopedia of Cookery, vol. 12, Fawcett Pub. Inc., N.Y., 1966, p. 1879.
Woman Day's Encyclopedia of Cookery, vol. 7, Fawcett Pub. Inc., N.Y., 1966, p. 1159.

*Primary Examiner*—David M. Naff
*Assistant Examiner*—Elizabeth A. Hatcher
*Attorney, Agent, or Firm*—John Maier, III

[57] ABSTRACT

A flexible dough is rolled into a sheet. A section of the sheet is removed and a pastry portion is inserted within the space where the section was removed. The sheet with the inserted pastry is prebaked. On the prebaked sheet are placed prepared foods such as pasta and meat and then the sheet with the prepared foods thereon and the inserted pastry are baked together, resulting in a food product, which after the portion has been removed, can be either eaten open on a platter or folded into a sandwich to be eaten in the hand apart from the pastry.

3 Claims, 4 Drawing Figures

U.S. Patent   Feb. 2, 1982   4,313,961
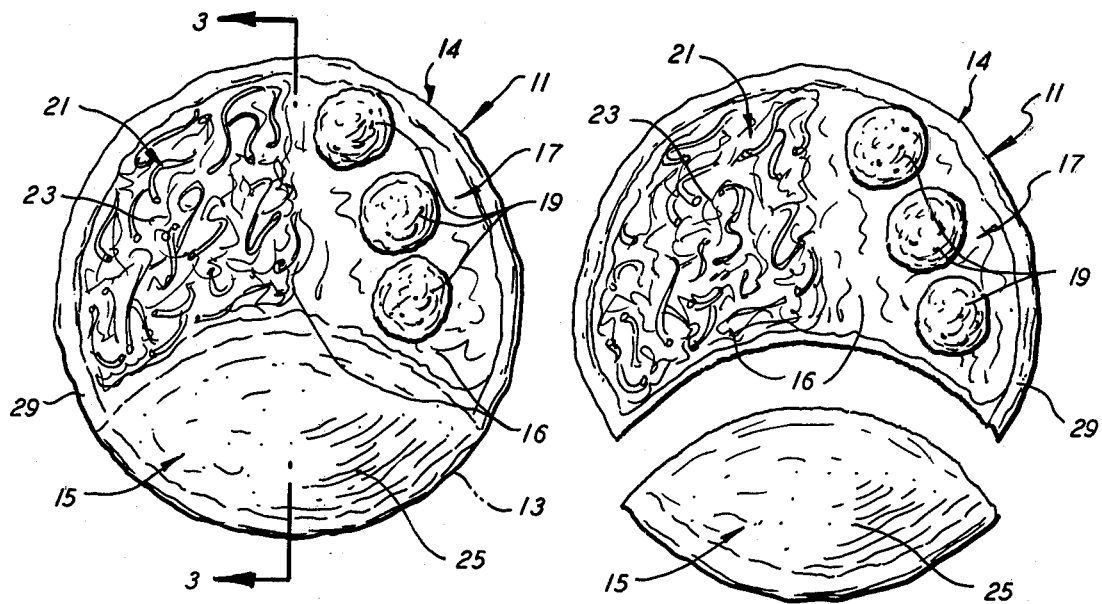
FIG.1    FIG.2
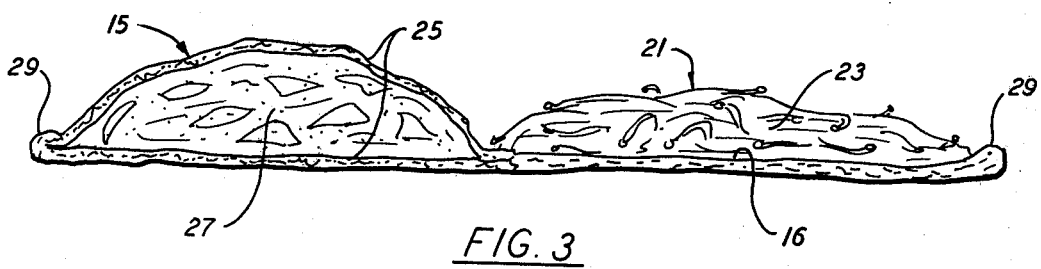
FIG.3
FIG.4

METHOD OF MAKING A COMPLETE MEAL FOOD PRODUCT

RELATED APPLICATION

This application is a continuation of copending application Ser. No. 31,543 filed Apr. 19, 1979 now abandoned.

BACKGROUND OF THE INVENTION

As is well known, fast food products have in recent years become very popular. One of the most popular fast food products, among others, is pizza followed by hot and cold sandwiches.

At this particular time, a new fast food product which is both enjoyable to eat and nutritious, providing a full meal, while still being easily eaten, is needed. Although fast food is very popular, there has been a limitation on the novelty and uniqueness of fast food products resulting in boredom of the public with the limited number of items available.

This invention relates in general to a method of making a new food product which provides a full meal including dessert that is both easily eaten and inexpensively produced. Prior art U.S. Pat. Nos. teaching various food products is as follows: Mattson 3,930,049, Ash et al 3,941,895, Kasik et al 4,016,298, A. Federico 3,845,219, Rubio 3,694,224, Rubio 3,690,893.

SUMMARY OF THE INVENTION

The present invention provides a method of making an improved food product which provides a full meal that is easily eaten. The food product is not only compatible with the taste preferences of many consumers but is simple and inexpensive to make and easily eaten.

The novel features which are considered as characteristic of the invention are set forth with particularity in the appended claims.

A flexible baked sheet of dough is formed by mixing together by proportion the following composition:
½ oz. salt
2¼ oz. white corn syrup
10 oz. luke warm water
1 oz. yeast
1 lb. 9 oz. high gluten flour
Milk curd produced from two qt. of milk heated to a temperature range of between 180° Farenheit and 185° Farenheit then soured by adding approximately 4½ oz. of lemon juice The heated and soured milk is then strained to remove the curd. The curd is then crumbled and then mixed with the other above-listed ingredients. The dough is formed into a sheet by rolling and is shaped preferably into a circular configuration. A section of about thirty percent of the sheet is removed. A separately produced pastry item is then inserted into the space. The remaining section of the sheet and the pastry item is then prebaked at approximately 400° Farenheit for approximately four minutes. Edible items are then partially prepared separately. Various items can be utilized but preferably spaghetti with a sauce and meat balls are selected to provide both a meat and a pasta. The edible items are then placed on the prebaked sheet. For example, the spaghetti is placed on one side and the meatballs on the other. The pastry, the dessert, the food products which are edible items are then all returned to an oven to be fully cooked. The food product is then ready for consumption. An important feature is that the sheet of dough is of such a composition as to be flexible even when baked so as to be capable of being folded over into a sandwich without destruction of the baked sheet. In the alternative, the food product may be eaten with a fork as an open sandwich. Before being eaten as a sandwich, the dessert is preferably removed for consumption after the rest of the sandwich is eaten.

The invention itself, however, as to its construction and obvious advantages will be best understood from the following description of the specific embodiment when read with the accompanying drawings.

DESCRIPTION OF THE DRAWINGS

FIG. 1 is a plan view showing the food product with the dessert section in place.

FIG. 2 is a plan view showing the food product with the dessert section slightly removed.

FIG. 3 is a cross-sectional view along line 3—3 of FIG. 1.

FIG. 4 is a perspective view showing the food product with the dessert removed and with the baked dough sheet wrapped around the edible items placed on it.

DETAILED DESCRIPTION OF THE PREFERRED EMBODIMENTS OF THE INVENTION

Although the description hereof is detailed and exact to enable those skilled in the art to practice the invention, the physical embodiments herein disclosed merely exemplify the invention which may be embodied in other specific structures. The scope of the invention is defined in the claims appended hereto.

In accordance with this invention, a food product is formed on a sheet 11 of dough. The sheet 11 is initially formed by rolling the dough. One most important feature of the dough used is its capability of being bent over itself without breaking after it has been fully baked. Preferably, but not essentially, the sheet 11 has a rounded shape but is more oval than circular, being, for example, seven inches by nine inches. A section 13, which would be about thirty percent of the area of the sheet 11, is removed preferably along the major axes of the oval. A remaining portion 14 of the sheet 11 is then preferably coated with a sauce, for example, tomato sauce.

The dough which forms the sheet 11 is made from various ingredients by proportion as follows:
½ oz. salt
2¼ oz. white corn syrup
10 oz. luke warm water
1 oz. yeast
1 lb. 9 oz. high gluten flour
Milk curd The milk curd is produced by heating two quarts of milk to a temperature range of 180° Farenheit to 185° Farenheit. Four and half ounces of lemon juice is then stirred into the heated milk. Stirring is continued until a curd rises to the surface of the heated milk. The milk is then removed from the heat and the curd is separated from the milk whey by straining the curd and whey through a cheese cloth. The curd is then cooled. After cooling, the curd is then crumbled. The crumbled and cooled curd is then blended with the above-stated ingredients into a dough mixture.

The dough is then formed into the sheet 11 which is rounded and which preferably has an oval shape. The section 13 is removed preferably along the main axes of the oval sheet 11 leaving the remaining portion 14 of the sheet 11. A dessert portion 15 is placed into the space where the section 13 was removed. A tomato sauce 16 is used to coat the shell 11 but not the dessert portion 15. The sheet 11 with the dessert portion 15 is then placed in an oven to be prebaked at approximately 400° Farenheit for about four minutes.

The sheet 11 with dessert portion 15 is then removed from the oven. Edible items which have been semi-precooked are then placed on about equal areas of the remaining portion 14 of the sheet 11. For example, on a meat section 17, meatballs 19 would be placed. On the other side of the remaining portion 14 of the sheet 11 or the pasta section 21, spaghetti 23 would be placed. In both instances, the meatballs 19 and the spaghetti 23 would be only precooked.

The composition of the meatballs would be as follows:
8 oz. chopped meat
4 oz. bread crumbs
2 oz. romano cheese
¾ oz. onion powder
¼ oz. garlic powder
1 egg The meatballs 19 would be shaped into small spheres and would be only precooked before placing them on the sheet 11. Similarly, the spaghetti 23 would be only precooked before being placed on the sheet 11.

The dessert portion 15 is formed on the same general configuration as the section 13 which was removed. The dessert portion 15 replaces the removed section 13 and is preferably made from a separate pastry dough 25 which would be made by mixing by proportion the following ingredients:
8 oz. flour
½ oz. yeast
6 oz. water
2 oz. sugar
1 whole egg A dessert filling 27 would be wrapped in the dessert pastry dough 25. The dessert filling 27 could be any type of fruit or pie filling. As one example, a riccotta of the following composition by proportion would be suitable:
1 lb. riccotta impastata
10 oz. granulated sugar
3 oz. raisins
2 oz. chocolate chips The dessert portion 15 and the remaining portion 14 of the sheet 11 with the meatballs 19 and the spaghetti 23 on it are baked at 450° Farenheit for a time range of seven to ten minutes. During baking, the edible items are covered, as for example with aluminum foil (not shown), to prevent the loss of moisture and heat.

One feature of the invention is that the dessert portion 15 can be removed and the remaining portion 14 can then be folded over into a sandwich even though the dough is baked. The food product may also be eaten as an open sandwich on a platter with the dessert portion 15 removed or left in place as part of the sheet 11. Since the dessert portion 15 is also baked within a pastry dough shell, it also can be hand held for easy consumption.

A nine by seven inch oval sheet 11 utilizes about 7 oz. of dough. The sheet 11 is about ¼ inch thick when rolled out. A border 29 is formed about the sheet 11 to a depth of approximately ½ inch.

The spaghetti 23 used with a seven by nine inch sheet 11 would be about 2 oz. when uncooked. Approximately 5 liquid oz. of tomato sauce would be used to coat the sheet and to be mixed with the spaghetti 23. Each one of the meat balls 19 would be approximately 3 oz. and there would be preferably three meatballs 19 per serving.

The invention may be embodied in other specific forms without departing from the spirit or essential characteristics thereof. The present embodiments are, therefore, to be considered in all aspects as illustrative and not restrictive. The scope of the invention is indicated by the appended claims rather than the foregoing description and all changes which come within the meaning of the range of equivalency of the claims are, therefore, intended to be embraced therein.

I claim:

1. A method of making a food product which comprises:
forming a milk curd as follows;
heating two quarts of milk to a temperature range of 180° Farenheit to 185° Farenheit,
stirring four and one-half ounces of lemon juice into the heated milk until a curd rises to the surface of the heated milk,
removing the milk from the heat,
separating the curd from the milk by straining,
cooling the curd,
crumbling the curd;
preparing a pastry dough by mixing by proportion with the cooled and crumbled milk curd the following:
½ oz. salt
2¼ oz. white corn syrup
10 oz. luke warm water
1 oz. yeast
1 lb. 9 oz. high gluten flour
rolling the dough into a sheet, said sheet requiring approximately seven ounces of dough to form a nine by seven inch oval sheet with a thickness of about one-quarter inch with a border of about one-half inch in thickness;
removing a section of the dough from the said sheet;
coating the remaining of said sheet with a sauce;
preparing a pastry dough by mixing together by proportion the following:
8 oz. flour
½ oz. yeast
6 oz. water
2 oz. Sugar
1 whole egg
preparing a dessert filling by mixing together by proportion the following:
1 lb. riccotta impastata
10 oz. granulated sugar
3 oz. raisins
2 oz. chocolate chips
wrapping the prepared pastry filling within the pastry dough to form a filled pastry;
inserting the filled pastry into the sheet where the section of the dough was removed;
prebaking together the sauce coated sheet and the inserted filled pastry at approximately 400 degrees Farenheit for approximately four minutes;
separately precooking at least two edible items;
placing the precooked edible items separately on the prebaked sauce coated sheet, said edible items including a pasta and a meat; and baking together the prebaked filled pastry and the prebaked sauce coated sheet with the two precooked edible items on it at approximately 450 degrees Farenheit for a time range of seven to ten minutes, to produce a fully cooked product suitable for consumption, the sheet of baked dough containing the two edible items being sufficiently flexible after baking to be bent over the edible items without breaking.

2. A method of making a food product according to claim 1 wherein said sauce used to coat the remaining sheet is a tomato sauce.

3. A method of making a food product according to claim 2 wherein said edible items include meatballs and spaghetti.

* * * * *